ELECTRONIC SWITCH FOR PROVIDING OUTPUT PULSES OF CONSTANT ENERGY LEVEL
Filed Oct. 7, 1965
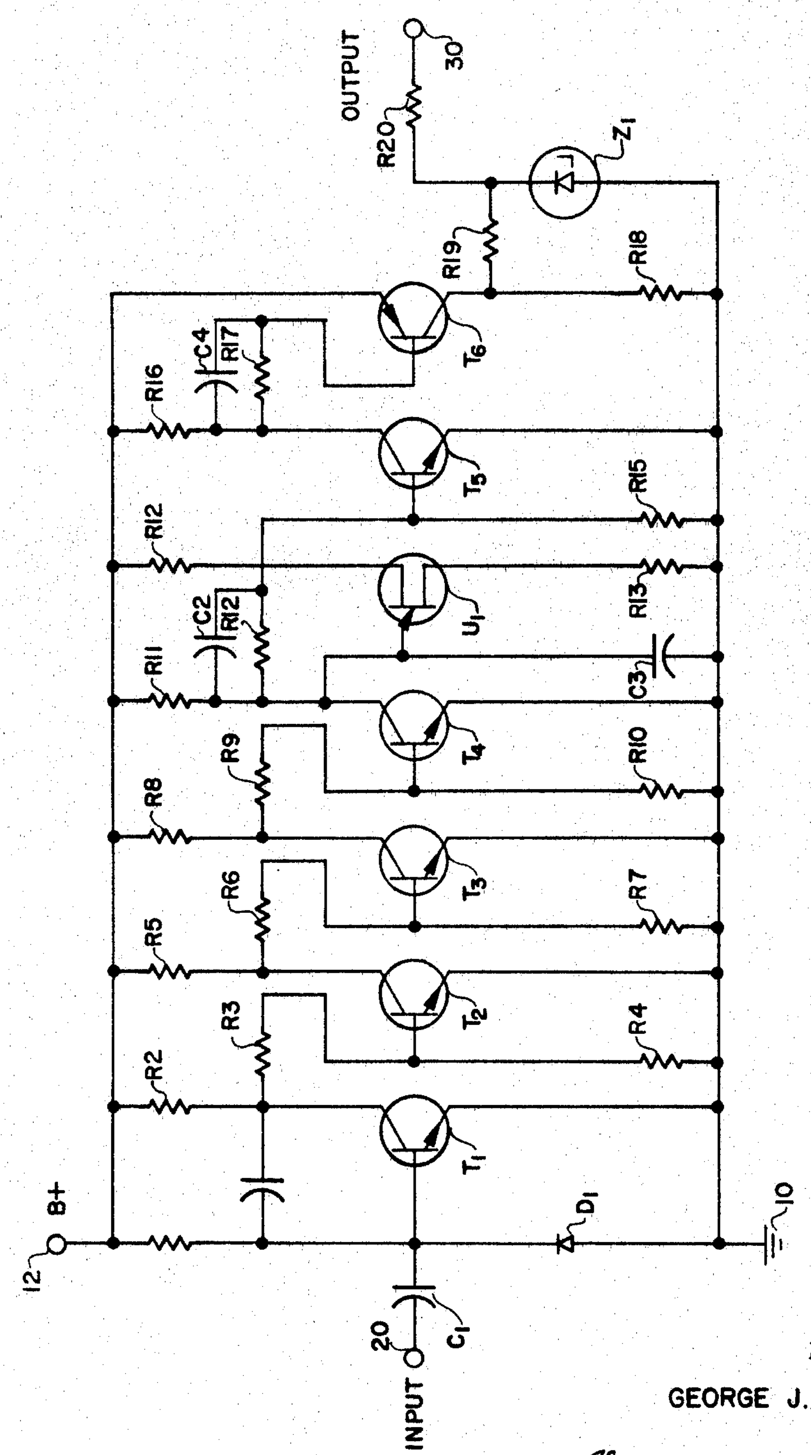
INVENTOR
GEORGE J. EHNI III
BY [signature]
ATTORNEY 3,392,289
Patented July 9, 1968

1

3,392,289

ELECTRONIC SWITCH FOR PROVIDING OUTPUT PULSES OF CONSTANT ENERGY LEVEL

George J. Ehni III, Dallas, Tex., assignor to Beta Corporation, Dallas, Tex., a corporation of Texas Filed Oct. 7, 1965, Ser. No. 493,696
6 Claims. (Cl. 307—264)

ABSTRACT OF THE DISCLOSURE

There is disclosed an electronic switching circuit which utilizes a unijunction transistor whose conductive state is determined by the charge on an associated capacitor for producing pulses of constant width and a Zener diode for regulating the height of the pulse in which the Zener diode and the unijunction transistor are cooperatively associated such that the area of the pulse is maintained constant even though the height and width of the pulse may vary due to fluctuations in the supply voltage, temperature, or other external factors.

This invention relates to an electronic switch for generating an output signal in response to an input signal, and more particularly to an electronic switch for generating constant energy output pulses in response to input pulses applied thereto.

Pulse series are often utilized in electronic circuitry as an indication or measure of a particular function, or a physical parameter, wherein the total number of pulses or number of pulses as a function of time can be used as a measure or indication of the function or parameter. It is often the case, however, that the individual pulses within the series are not identical, or do not represent a constant electrical energy. The result of this is to limit the number of means to measure or determine the number of pulses, wherein it is desirable, in certain instances, to use means which determine the number of pulses in the series by virtue of the electrical energy represented by the pulses. Such is the case of many electrical meters, for example, that provide an indication of some parameter in response to the electrical energy input thereto by integration.

This invention provides an electronic switch which is responsive to pulses at its input to generate other pulses at its output equal in number to the number of input pulses, wherein the output pulses are of extremely constant energy, even over a wide range of varying energies represented by the input pulses. Consequently, almost any additional means operable in response to the output pulses from this electronic switch can be used to measure the number of input pulses, regardless whether the additional means operates on the principle of the actual number of pulses or on the principle of the energy represented by the pulses.

To accomplish this, the invention provides an electronic circuit that is responsive to the application of an input pulse to generate an output pulse of constant energy. More particularly, the circuit of the present invention comprises means responsive to an input pulse to generate an output pulse of extremely constant width, and additional means cooperating with the first mentioned means for regulating the height of this output pulse at an extremely constant level, thus jointly generating an output pulse representing a very constant area, or energy. In a further embodiment the first and second means just mentioned additionally cooperate to maintain the area, or energy, of the pulse constant even though the width and height thereof may be caused to vary by these means as a result of fluctuations in the supply voltage to the circuit, ambient temperature or other external factors. This is accomplished in that the first and second mentioned means produce offsetting results in response to these external factors, so that if the first mentioned means produces a narrower pulse, the second mentioned means regulates it at a correspondingly higher level to maintain the area, or energy, constant, and vice-versa. In a preferred embodiment of the invention, the combination of a charging circuit and unijunction trasistor is used o provide a trigger circuit for controlling the width of the pulse, and a Zener diode is used to cooperate therewith for very accurately regulating the height of the pulse.

2

Many other objects, features and advantages of the invention will become readily apparent from the following detailed description of a preferred embodiment thereof when taken in conjunction with the appended claims and the sole figure of the drawing, which figure is an electrical schematic diagram of the invention.

One application of the invention is disclosed in the co-pending application entitled "Turbine Control System," Ser. No. 514,416, filed Dec. 16, 1965, and assigned to the assignee of the present application. The invention is used, in this particular application, as a speed switch which operates in response to pulses produced by a magnetic reluctance pickup used to measure the speed of the shaft of a turbine. The pickup, or transducer, produces three pulses for every revolution of the turbine shaft, whereby it is evident that the number of pulses produced as a function of time is proportional to the speed of the shaft. In the particular control system disclosed in this application, a tachometer and meter relay are operated in response to an electrical signal indicative of the turbine speed, wherein the tachometer and meter relay integrates input pulses applied thereto and indicates a speed as determined by the summing or integration of the energy of the pulses as a function of time. However, the pulses produced by the transducer are not of constant energy, and therefore, the electronic switch (referred to as the speed switch in the above mentioned patent application) is interposed between the output of the transducer and the input of the tachometer and meter relay to generate one pulse for every pulse produced by the transducer and regulate the energy of the pulses applied to the tachometer input at an extremely constant level.

Many other applications of the electronic switch of the invention, in addition to that discussed above, will become apparent as the description of a preferred embodiment thereof proceeds. Referring now to the figure of the drawing, the circuit of the invention includes an input 20 at which a series of pulses may be applied, and an output 30 at which the constant energy pulses are derived in response to the input pulses. As noted earlier, the circuit to be described produce one output pulse for every input pulse, wherein the output pulses are of extremely constant energy. In its application as a speed switch as described in the above mentioned co-pending patent application, the input of the circuit is connected to the output of a suitable speed transducer associated with a turbine shaft, such as, for example, a magnetic reluctance pickup that generates three pulses at its output for each revolution of the turbine shaft. The output, in this application, is connected to the input of a tachometer and meter relay, the latter of which integrates the output pulses as a function of time to produce other output signals proportional to the speed of the turbine shaft. Thus it is evident that the output pulses from the electronic switch must have an extremely constant energy in order that the output signals from the tachometer and meter relay be truly indicative of the speed of the turbine shaft.

The input 20 of the circuit is applied to the base of a transistor $T_1$ through capacitor $C_1$, wherein the emitter of the transistor is connected to ground 10. A diode $D_1$ is connected between the input and ground to prevent the base of the transistor from going below ground potential.

The collector of this transistor is connected to the base of transistor $T_2$ through resistor $R_3$, with the base of this transistor being connected to ground through resistor $R_4$ and the collector to B+ through resistor $R_5$. The collector of transistor $T_2$ is connected to the base of transistor $T_3$ through resistor $R_6$, with the base of transistor $T_3$ being connected to ground through resistor $R_7$ and the collector to B+ through load resistor $R_8$. The collector of transistor $T_3$ is connected to the base of transistor $T_4$ through resistor $R_9$, with the base of the latter transistor being connected to ground through resistor $R_{10}$ and the collector thereof being connected to B+ through resistor $R_{11}$. The collector of transistor $T_4$ is now connected to the emitter of a unijunction transistor $U_1$, wherein the emitter of the latter is also connected to ground through a charging capacitor $C_3$ and the two base terminals $B_2$ and $B_1$ are connected to B+ and ground, respectively, through resistors $R_{12}$ and $R_{13}$. The collector of transistor $T_4$ is also connected to the base of transistor $T_5$ through the parallel connection of capacitor $C_2$ and resistor $R_{14}$, with the base of the latter transistor being connected to ground through resistor $R_{15}$ and the collector thereof being connected to B+ through resistor $R_{16}$. The collector of transistor $T_5$ is connected to the base of transistor $T_6$ through the parallel connection of resistor $R_{17}$ and capacitor $C_4$, the emitter of the latter transistor being connected to B+ and the collector being connected to ground through resistor $R_{18}$. Finally, an output of the speed switch is derived from the collector of transistor $T_6$ through resistor $R_{19}$ and resistor $R_{20}$ to output connection 30, with a Zener diode $Z_1$ being connected between the juncture of resistors $R_{19}$ and $R_{20}$ and ground potential 10. It will be noted that transistors $T_1$–$T_5$ each have their emitter connected to ground and, in the specific example shown, are of n-p-n type wherein transistor $T_6$ is of the p-n-p type. The supply voltage B+ is therefore of negative potential, suitably —24 volts.

Upon the application to input 20 of a positive voltage, transistor $T_1$ is turned on, transistor $T_2$ is turned off, transistor $T_3$ is turned on, and transistor $T_4$ is turned off. The first three transistors function to shape the input pulses to produce a square wave at the collector of the third transistor in a conventional manner. The fourth transistor $T_4$ is turned off each time a positive input pulse is applied to the base of the first transistor. When transistor $T_4$ is turned off, its collector will try to rise to B+ potential, and charging capacitor $C_3$ will start charging toward this potential through load resistor $R_{11}$. When capacitor $C_3$ is charged to a voltage of sufficient value as determined by the unijunction transistor intrinsic standoff ration ($n$), the unijunction transistor $U_1$ will conduct and discharge the capacitor through the emitter-base path. The voltage appearing at the emitter of unijunction transistor $U_1$ is also applied to the base of transistor $T_5$, causing it to conduct when capacitor $C_3$ is charged sufficiently. This transistor will conduct until the unijunction transistor is made to conduct, at which time it will be turned off as a result of capacitor $C_3$ discharging and applying ground potential on the base thereof through resistor $R_{12}$ and capacitor $C_2$. Thus it will become apparent that the turning on of transistor $T_5$ is governed by the turning off of transistor $T_4$, but that the turning off of transistor $T_5$ is determined by the time constant of resistor $R_{11}$ and capacitor $C_3$ and the cooperation of unijunction $U_1$ to discharge capacitor $C_3$ upon its reaching its trigger point ($n$). It will be apparent then that, regardless of the width of the pulses applied to input 20, the width of the pulse generated at the collector of transistor $T_5$ will be extremely constant. It will also be apparent that the time between the pulses applied to input 20 must be longer than the time constant of the timing circuit previously mentioned. Of course, this time constant can be fixed at any desired value which will not vary, thus insuring a constant pulse width.

The output derived from the collector of transistor $T_5$ is applied through transistor $T_6$ for impedance matching purposes, wherein the output is derived from the collector of transistor $T_6$ through transistor $R_{19}$ and resistor $R_{20}$. The Zener diode $Z_1$ connected between the output connection 30 and ground potential clips the voltage pulses generated at the output at a very constant level. Since these pulses are already of extremely constant width, the area beneath the pulses, or the energy contained therein, is extremely uniform. This is so even though the supply voltage, ambient temperature and other external factors may vary over reasonably wide ranges. Insofar as any temperature variations, the height of the pulses may vary therewith to some degree, but because temperature changes affect the unijunction transistor $U_1$ and Zener didoe $Z_1$ in opposite ways (meaning that if the unijunction transistor breaks down at a lower voltage as a function of a temperature change, the Zener diode will break down at a corresponding higher voltage for the same temperature change, and vice-versa), the area of the output pulses will still remain extremely constant even though a pulse may simultaneously become more narrow and higher or, alternatively, wider and shorter. Thus it can be seen that the constant energy output pulse circuit results in large part from the cooperation between the unijunction transistor $U_1$ and Zener diode Z.

Although the invention has been described with reference to a particular preferred embodiment thereof, many changes nad modifications will become apparent to those skilled in the art in view of the foregoing description which is intended to be illustrative and not limiting of the invention defined in the appended claims.

What is claimed is:

1. An electronic switch comprising:

(a) an input;

(b) an output;

(c) a unijunction transistor having a pair of base electrodes and an emitter, electrode, interconnected at its base electrodes with a supply potential and a reference potential, respectively;

(d) a first device having first and second conduction electrodes and a control electrode interconnected at said first and said second conduction electrodes with said supply potential and said reference potential, respectively, and interconnected at said control electrode with said input for being rendered conductive in response to a signal applied to said input and for being rendered non-conductive when said signal is removed from said input;

(e) a capacitor interconnected at one electrode with said first conduction electrode of said first device and said emitter electrode of said unijunction transistor and interconnected at the other electrode with said reference potential for charging in response to said first device being rendered non-conductive to render said unijunction transistor conductive at a settable time after said first device is rendered non-conductive and for being discharged through said unijunction transistor upon conduction thereof;

(f) a second device having first and second conduction electrodes and a control electrode interconnected at said first and said second conduction electrodes with said supply potential and said reference potential, respectively, and interconnected at said control electrode with said one electrode of said capacitor and said first conduction electrode of said first device for being rendered conductive in response to said first device being rendered non-conductive and for being rendered non-conductive in response to the discharge of said capacitor through said unijunction transistor to apply first and second voltages of different magnitudes, respectively, to said output; and (g) a third device interconnected between said output and said reference potential for maintaining the difference between said first and said second voltages constant.

2. An electronic switch according to claim 1 wherein each of said first and said second devices comprises a transistor and said third device comprises a Zener diode.

3. An electronic switch according to claim 1 wherein the voltages at said first conduction electrode of said first device are substantially equal to said reference potential and said supply potential when said first device is rendered conductive and non-conductive, respectively, and said second voltage applied to said output is substantially equal to said reference potential.

4. An electronic switch according to claim 1 including a resistance connected to said first electrode of said first device through which said capacitor charges.

5. An electronic switch according to claim 1 including amplifying means connected between said input and said control electrode of said first device for producing a substantially square wave pulse at said control electrode of said first device in response to a pulse applied to said input.

6. An electronic switch according to claim 5 wherein said first device comprises a switching device which produces a substantially square wave pulse at first conduction electrode thereof in response to a square wave pulse applied to said control electrode thereof.

References Cited

UNITED STATES PATENTS

| | | | |
|---|---|---|---|
| 3,222,550 | 12/1965 | Willard et al. | 307—88.5 |
| 3,275,898 | 9/1966 | Rosso et al. | 307—88.5 |

FOREIGN PATENTS

| | | |
|---|---|---|
| 1,162,726 | 2/1964 | Germany. |

ARTHUR GAUSS, *Primary Examiner.*

S. D. MILLER, *Assistant Examiner.*